(No Model.)
S. MITCHELL.
HUB.
No. 302,274. Patented July 22, 1884.
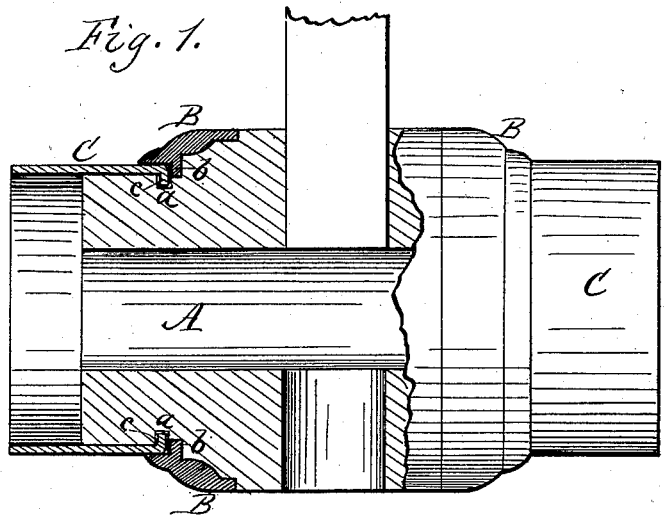
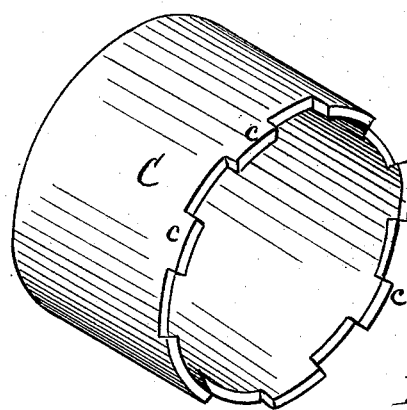
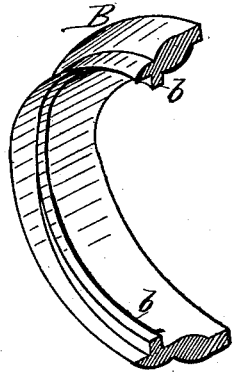
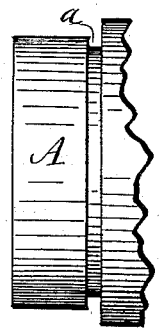
Attest.
Chas F. Spencer
P. Heintsch
Inventor.
Saml. Mitchell.
per R. F. Osgood,
Atty

UNITED STATES PATENT OFFICE.

SAMUEL MITCHELL, OF LIMA, NEW YORK.

HUB.

SPECIFICATION forming part of Letters Patent No. 302,274, dated July 22, 1884.

Application filed November 27, 1883. (No model.)

*To all whom it may concern:*

Be it known that I, SAMUEL MITCHELL, of Lima, Livingston county, New York, have invented a certain new and useful Improvement in Hubs; and I do hereby declare that the following is a full, clear, and exact description of the same, reference being had to the accompanying drawings, in which—

Figure 1 is a view, partially in elevation and partially in section, of a hub showing my improvement. Fig. 2 is a perspective view of one of the bands of the hub. Fig. 3 is a similar view of one-half of one of the clamping-rings of the hub. Fig. 4 is an elevation of one end of the hub.

My improvement relates to vehicle-hubs which have two rings encircling the hub on opposite sides of the spokes, for the purpose of strengthening the hub and preventing splitting.

The invention consists in the method of connecting the ring and the band, whereby they lock themselves in place on the hub and obviate the use of rivets, bolts, or other devices for the purpose.

In the drawings, A shows the hub. B B are the two rings that encircle the hub on opposite sides of the spokes, and C C are the bands. The hub near its end is provided with a circumferential groove, $a$, of the form shown in the external view, Fig. 4. The ring B, on its inner side, is provided with a square projecting shoulder, $b$, extending all the way around. This shoulder rests just back of the groove $a$ when the ring is in place on the hub. The band C is made of malleable or wrought metal, and has on its inner end a series of projecting lugs, $c\ c$, which stand straight in line with the body of the band, as shown in Fig. 2. The ring B is first fitted in place. The band C is then fitted over the end of the hub, its inner end passing under the projecting edge of the ring and its lugs $c\ c$ resting against the shoulder $b$ of the ring. The band is then forced inward, either by driving it or by applying powerful pressure, and by this means the lugs $c\ c$ are turned down at right angles and strike into the groove $a$ of the hub, locking the parts firmly in place. The lugs by resting in the groove hold the band on the hub, and the band by resting against the shoulder of the ring holds the ring in place. The use of rivets, bolts, and other devices for the purpose is avoided.

The rings may be of any desired form.

The bands may be used at one or both ends of the hub, may project beyond the hub at the outer end or rest flush with it, and may be made open or closed at the outer end, as desired.

What I claim as new is—

The combination, with the hub provided with a circumferential groove, of the ring provided with an inwardly-projecting shoulder, and the band provided with lugs on its inner end, so that when driven in place the lugs, by striking the shoulder, will be turned down into the groove, as set forth.

In witness whereof I have hereunto signed my name in the presence of two subscribing witnesses.

SAMUEL MITCHELL.

Witnesses:
WM. B. BAKER,
DANIEL WEST.